May 13, 1969     L. P. BUSHNELL     3,444,035
BREATHABLE FABRICS AND METHODS OF PRODUCING THE SAME
Filed Sept. 13, 1965
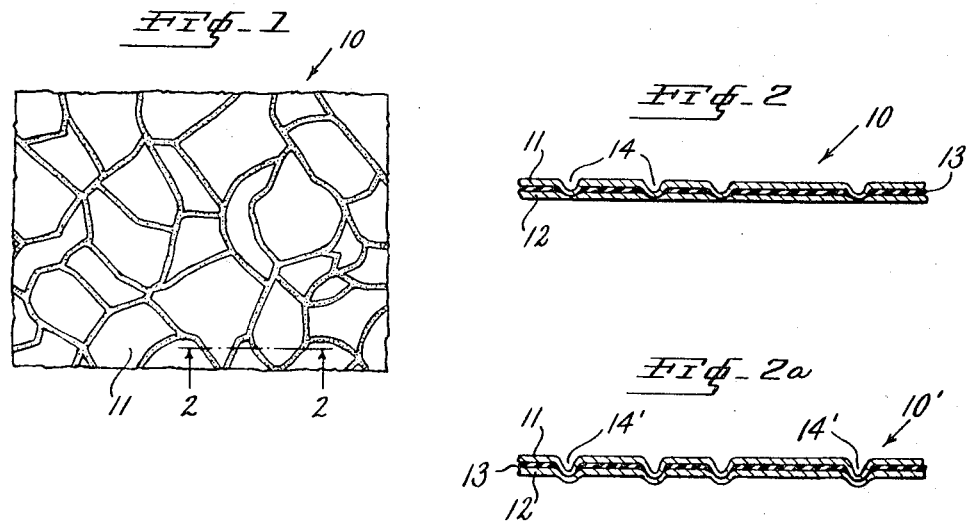
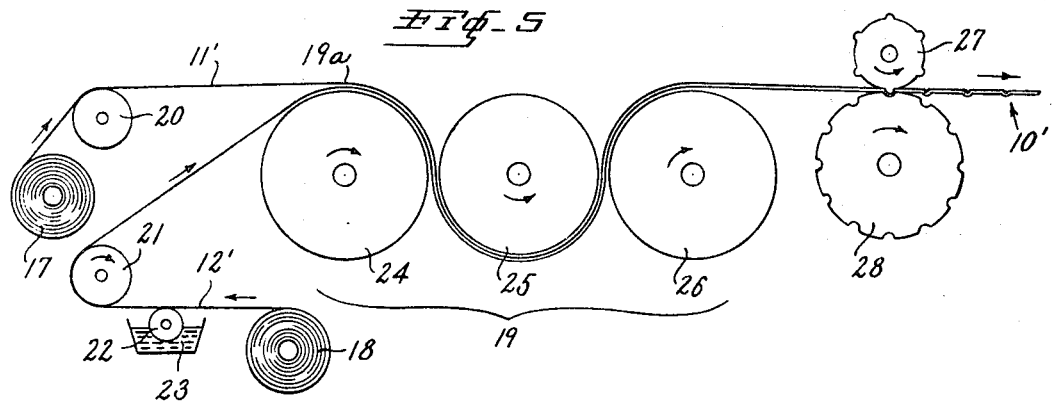
INVENTOR
LESTER P. BUSHNELL
BY Norbert P. Holler
ATTORNEY United States Patent Office
3,444,035
Patented May 13, 1969

3,444,035
BREATHABLE FABRICS AND METHODS OF
PRODUCING THE SAME
Lester P. Bushnell, South Bend, Ind., assignor to Uniroyal, Inc., a corporation of New Jersey
Filed Sept. 13, 1965, Ser. No. 486,724
Int. Cl. D03d 3/04; B32b 3/02, 5/22
U.S. Cl. 161—73                                    26 Claims

ABSTRACT OF THE DISCLOSURE

A laminar breathable fabric composed of a top layer constituted by a plated knit fabric of thermoplastic and non-thermoplastic fiber materials, and a bottom layer constituted by a back-up fabric of non-thermoplastic fiber material, bonded to one another by an intermediate layer of adhesive. The plated fabric is so knit that substantially only the thermoplastic fiber component is exposed at one face and substantially only the non-thermoplastic component at the other face of the plated fabric, and the back-up fabric is bonded to the face of the plated fabric constituted by the non-thermoplastic component. The entire laminate may be embossed under heat and pressure to produce a pattern of impressions and raised portions at the top face, imparting thereto a three-dimensional character.

---

This invention relates to breathable fabrics of the type having a three-dimensional charactered surface, and to processes of producing such fabrics.

Fabrics of the type having applied to one surface thereof discrete "dots" or discontinuous sheeting of synthetic resinous material are well known. Such fabrics, which are generally characterized as "breathable" and have high wear resistance while still being air-permeable, have in the past met with considerable commercial acceptance and success for a variety of uses, e.g. as automotive upholstery covers, headliners for cars, furniture covers, etc.

It is an important object of the present invention to provide novel and greatly improved breathable fabrics.

It is another object of the present invention to provide breathable fabrics which have the appearance, feel and comfort generally associated with conventional fabrics, but which also have the high wear resistance qualities and launderability of the previously known resin-coated fabrics.

Still another object of the present invention is the provision of such breathable fabrics in which the high wear resistance of the known resin-coated fabrics is achieved without any application of a synthetic resinous coating material to the base fabric, except for decorative effects.

It is also an object of the present invention to provide novel processes of producing such breathable fabrics.

Yet another object of the present invention is the provision of processes by which such breathable fabrics may have a permanent three-dimensional design imparted thereto by a thermal embossing operation.

Broadly speaking, the objects of the present invention are attained through the lamination of two filamentary fabric plies to one another, the first or top ply being constituted by a plated fabric composed of both thermoplastic synthetic filaments or yarns and non-thermoplastic strands or yarns knitted in such a manner that one surface of the top ply is defined exclusively by the thermoplastic filamentary material while the other surface is defined exclusively by the non-thermoplastic yarns, and the second or backing ply being either a woven or a knit fabric composed entirely of such non-thermoplastic yarns and being adhesively bonded to the non-thermoplastic surface of the top ply.

The plated fabric ply is generally made in such a manner as to ensure that its thermoplastic yarn content is not less than 20% of the total weight of the ply and generally is between about 40% and about 70% of its weight. The thermoplastic yarn component of the plated fabric ply may be nylon, polyester, polyethylene, polypropylene, a vinyl polymer or copolymer, an acrylonitrile polymer or copolymer, or any other suitable thermoplastic synthetic fiber which is adapted for use in fabric applications and is heat-deformable below its degradation temperature. The non-thermoplastic yarn component of this ply is preferably 100% cotton, but it may comprise blends of cotton and rayon up to a 25/75 mixture. The backing ply likewise is preferably 100% cotton, but if desired it may be made from a cotton-viscose rayon blend containing up to 75% by weight of rayon.

The two fabric plies are laminated to each other with the aid of any suitable cement or adhesive composition applied either to one surface of the backing ply or to the non-thermoplastic yarn surface of the plated fabric ply, which adhesive may be of the thermoplastic type, e.g. based on vinyl resin plastisols, but preferably is one which becomes at least partly thermosetting when heated to a temperature of about 280° F. and thereby is rendered more resistant to cleaning solvents and like materials with which the ultimate fabric may at some time be treated. Inasmuch as this construction provides a cotton-to-cotton bond, the adhesive between the surfaces is excellent. The final laminate thus has high strength due to the presence of the nylon or other plating fiber component, as well as sufficient bulk from the cotton plies to provide stability and to facilitate imparting thereto a three-dimensional surface design by means of a thermal embossing operation, and is further characterized by the soft "hand" or "feel" and air permeability of a conventional fabric and by the resistance to wear and soiling and the cleaning properties of resin-coated fabrics.

The foregoing and other objects of the present invention, as well as further characteristics and advantages of the end products and of the manner of manufacture thereof, will be more clearly understood from the following detailed description when read in conjunction with the accompanying drawing, in which:

FIG. 1 is a diagrammatic top plan view of an embossed breathable fabric according to the present invention;

FIG. 2 is a sectional view taken along the line 2—2 in FIG. 1;

FIG. 2a is a similar sectional view but shows the fabric embossed to a greater depth;

FIGS. 3 and 4 are schematic illustrations of the multi-ply laminar construction of the fabric according to two aspects of the present invention; and FIG. 5 is a schematic illustration of an apparatus which may be employed in the manufacture of a fabric according to the present invention.

Referring now to the drawing in greater detail, the fabric 10 (FIGS. 1 and 2) according to one aspect of the present invention is a multi-ply structure composed of a top or face ply 11 and a bottom or backing ply 12 laminated to one another by means of an intermediate discontinuous layer 13 of adhesive, the composite laminate being further grooved or embossed in accordance with any desired predetermined pattern or design as indicated at 14. The fabric 10' (FIG. 2a) is essentially identical in construction to the fabric 10, but differs therefrom only in that the depth of embossing, as indicated at 14', is somewhat greater. Only one surface of the fabric 10 thus has a three-dimensional character, whereas both surfaces of the fabric 10' are three-dimensional in character, the bottom surface being essentially a negative of the top surface.

Referring now to FIGS. 3 and 4, it will be seen that the upper or face ply 11 of the fabric 10 or 10' is composed of a plated fabric formed by suitably knitting strands or yarns 15 of thermoplastic filamentary material with strands or yarns 16 of non-thermoplastic filamentary material in such a manner that the upper surface of the ply 11 is defined substantially entirely by the thermoplastic fiber component 15, while the lower surface of the ply 11 is defined substantially entirely by the non-thermoplastic fiber component 16. As previously set forth herein, the thermoplastic fiber component 15 of the ply 11 may be vinyl, polyethylene, polypropylene, nylon and the like with a total denier between about 100 and 200. Concurrently, the non-thermoplastic fiber component 16 may be combed cotton or a cotton-rayon mixture with a cotton content of at least 25%. In order to render the plated fabric ply 11 readily receptive to the embossing operation, the thermoplastic fiber content is preferably between about 40 and 70%, but in any event not less than about 20%, based on the weight of the ply which is generally between about 5 and 10 ounces per square yard and preferably about 7 oz./sq. yd.

The lower or backing ply 12, on the other hand, may be constituted either by a circular jersey knit fabric, designated 12a in FIG. 3, or by a woven fabric, designated 12b in FIG. 4, composed entirely of non-thermoplastic yarns or like filamentary material and having a base weight of between about 2.5 and 7.0 ounces per square yard and preferably about 3 to 3.5 oz./sq. yd. in case of the knit fabric and about 4 to 6 oz./sq. yd. in the case of the woven fabric. Thus, the ply 12 is generally composed of 100% cotton or of a cotton-viscose rayon blend with a maximum rayon content of 75% by weight. The use of a cotton-rayon blend in the backing ply, with a rayon content ranging from 50 to 75% by weight, is preferred in order to achieve a maximum tensile strength at lowest cost. The ply 12, in addition to improving the strength of the fabric 10 or 10', also provides for added bulk, greater stability and greater depth of embossing, and an acceptable "hand" or "feel."

It will be understood that the choice of either a knit or a woven backing fabric will depend on various factors, e.g. on the intended manner of handling and uses for the end product being made, on whether or not an appreciable degree of stretchability of the laminated end product is desirable or can be tolerated, on the difference in cost between a knit backing fabric and a woven backing fabric, etc. In some applications, for example, stretchability might be undesired as tending to permit a distortion or minimizing of the embossed pattern in the product under relatively severe stresses to which the same may be subjected in use, and for such applications it may be preferable to utilize a relatively non-stretchable woven backing fabric 12b. Of course, even in a generally heavily stressed product such as a seating fabric, the backing ply may be a knit fabric 12a, since a certain amount of "give" and resiliency is desirable.

The cement layer 13 may be any suitable adhesive composition and preferably is initially applied as a fluid film or coating. In general, the cement should be of such a character as to be solidified when heated to a predetermined elevated temperature, and as to form a discontinuous film which is, when set, still sufficiently soft and flexible to avoid any adverse effect on the softness, pliability and breathability of the ultimate fabric. Merely by way of example, vinyl resin plastisols as well as aqueous dispersions or emulsions of certain polymerizable monomers have been found to satisfy these conditions. One representative adhesive composition of the latter type is made by mixing about 100 parts (by weight) of a material made by Rohm & Haas Company and sold under the trade name "Rhoplex E-32" (an aqueous emulsion or dispersion of acrylic copolymers such as a major proportion of ethyl acrylate and a minor proportion of methyl methacrylate) with about 2 to 3 parts of a catalyst, e.g. ammonium chloride, and about 3 to 5 parts of a thickening agent, e.g. a colloidal silica. Although the cement may be applied either to the undersurface of the ply 11 over the non-thermoplastic yarns 16 or to one surface of the backing ply 12, it is preferred that it be applied to the latter and generally in the amount of about 3 to 4 ounces per square yard of the ply.

In the production of the fabric 10 or 10', it will be understood that the lamination of the plies 11 and 12 and the subsequent embossing thereof may be carried out either separately or as closely following parts of one continuous operation. A representative embodiment of such a continuous operation is illustrated schematically in FIG. 5.

As there shown, the plated fabric 11' and backing fabric 12' which are to constitute the plies of the ultimate end product fabric are unwound from respective supply spools or beams 17 and 18 and guided toward the laminating apparatus 19 around idler rolls 20 and 21. The fabric 12' travels past and in light rolling surface contact with an adhesive applicator roller 22 partly submerged in a bath 23 of the liquid cement, whereby a discontinuous film of the cement or adhesive composition is applied to the ultimately inner surface of the fabric 12'. The adhesive should generally have a viscosity between about 11 and 17 seconds as determined with a ¼" modified Zahn cup consisting of a cylindrical body 2 inches in diameter and 1¹¹⁄₁₆ inches in height and a funnel-shaped right circular truncated conical bottom terminating in a discharge opening ¼ inch in diameter, the height of the funnel being ⅞ inch measured from the plane of the dicharge opening to the plane of the juncture between the funnel and the cylindrical body.

While the adhesive coating is still wet, the fabric 12' is plied with the fabric 11' at the entrance 19a of the laminating apparatus 19 and is then passed under tension ranging from about 2 to 5 pounds per square inch and at a linear speed ranging from about 10 to 30 yards per minute around and between respective internally heated drying cans or rollers 24, 25 and 26 which subject the laminate to a suitable pressure between about 20 and 60 pounds per square inch and simultaneously heat the cement until the same is solidified. The composite laminate is then passed at a linear speed of about 10 to 12 yards per minute between a pair of mated embossing rolls 27 and 28, of which the former may be provided with protruding ridges or the like and the latter with corresponding grooves or the like, if a fabric 10' is to be produced. For the production of the fabric 10, of course, the provision of a grooved back-up roll 28 is not required, and the same may be replaced by an ungrooved back-up roll (not shown).

The preferably metallic embossing roll 27 is generally heated to a temperature between about 300° and 500° F., depending on the nature of the thermoplastic fiber employed in the plated fabric ply 11, and the pressure at the nip of the rolls is approximately 500 to 2,000 pounds per lineal inch. Upon leaving the embossing roll unit 27-28, the fabric 10 or 10' is preferably passed through a cooling zone (not shown) preparatory to being fed to a suitable roll-up device (not shown).

It will be understood that the fabric laminate, prior to being subjected to the embossing operation, may be provided with a printed surface design by means of acrylic latices, vinyl compositions or the like. A printing ink composed of a major proportion of "Rhoplex E-32" and minor proportions of catalyst, thickening agent, antifoaming agent, and pigment has been found well suited for this purpose. Conventional slip finishes, as well as other protective finishes or the like, e.g. soil repellents, etc., can optionally also be applied at this point. Such materials can, of course, be applied to both printed and unprinted fabrics made of various types of fibers.

The products produced by this process are thus seen to be three-dimensional in character, and because the shape is formed while the material is at an elevated temperature, the three-dimensional form is essentially permanent unless the laminate is exposed to temperatures exceeding the embossing temperature. In the case of the fabric 10', further, the underside of the embossed laminate can be filled with a foam composition, e.g. a polyurethane foam, a latex foam, a vinyl foam or the like, for added cushioning and to support the raised areas in the embossed pattern.

The grooved embossing roll 28 may, of course, be formed in any suitable manner and of any desired material. One expedient which I have found both simple and economical is to employ a paper-filled roll. The originally cylindrical outer covering is softened by soaking with water plus surface activators (wetting agents) and then provided with the desired surface impressions by forcing it, while rotating, against the rotating male embossing roll 27. The diameter of the roll 28 must, in this case, be a full even or odd multiple of the diameter of the roll 27. The back-up roll, after receiving the impressions, is then dried to cause the impressions to be permanently set in the paper surface thereof, whereby the two rolls are provided with mated patterned surfaces at the nip.

The invention is further illustrated by the following examples.

EXAMPLE I

A circular knit plated fabric was formed from continuous filament 200 denier nylon yarn and 40 count combed cotton yarn composed of 100% cotton, the plated fabric weighing 7 oz./sq. yd. and having approximately a 60% nylon content and a 40% combed cotton content. Only the nylon yarn was exposed at the upper surface of the plated fabric, and only the cotton yarn at the lower surface. The lower surface of the plated fabric was brought into face to face contact with the adhesive coated surface of a 100% cotton circular jersey knit backing fabric. The weight of the backing fabric was 3.5 oz./sq. yd., and the starting wet adhesive layer had an overall weight of 4 oz./sq. yd. of the backing fabric. The cement was prepared by mixing 100 parts (by weight) of "Rhoplex E-32" acrylic emulsion with 2 parts of ammonium chloride catalyst and 5 parts of "Cab-O-Sil" collodial silica to a viscosity of 14 seconds as measured with a modified ¼″ Zahn cup. The contacted plated and backing fabric plies were advanced at a linear speed of 10 yds./min. between and around a plurality of heated drying cans rotating at 1⅔ r.p.m. and maintained at a temperature of 280° F. to laminate the plies and dry the cement. The resultant laminate was then fed at a speed of 5 yds./min. through an embossing roll unit exerting a nip pressure of 2,000 pounds and consisting of a metal embossing roll heated to a temperature of 450° F. and a mated paper-filled back-up roll having a diameter of 2 times that of the embossing roll, and in which the surface grooves were formed by initially pressing the rotating wet paper sheath against the rotating embossing roll and then drying the indented paper. The final product was found to weigh approximately 12.5 oz./sq. yd., to be possessed of good "hand" or "feel" and of good cleaning characteristics and breathability, and to be highly resistant to wear as well as to delamination upon washing in water. This fabric may be used as an upholstery material for furniture and vehicle seats, as a headliner and door panel facing for cars, as an outer shell material for outerwear garments, and in footwear.

EXAMPLE II

A laminated fabric identical to that set forth in Example I was made by the same procedure and with the same operating conditions. Upon leaving the laminating unit, however, the still unembossed laminate was fed to a printing machine where a colored design was applied to the top (nylon) surface of the laminate. The printing ink employed, which was applied by means of an etched or engraved metal roll coating with a rubber back-up roll, was composed of 100.00 parts by weight of "Rhoplex E-32." 5.0 parts of a 10% aqueous solution of ammonium chloride, 0.62 part of "Cab-O-Sil" M-5 thickener, 0.02 part of an anti-foaming agent, and approximately 6.00 parts of pigment, and had a viscosity of about 8 seconds as determined with a ¼″ modified Zahn cup. The laminar web was then passed for about ½ minute through an oven to temper and dry the print, the oven temperature being approximately 350° F. Thereafter, the web was run through the embossing unit as set forth in Example I.

EXAMPLE III

The procedure of Example II was repeated except that between the printing and embossing operations a fluorocarbon soil repellent of the type available commercially under th trademarks "Scotchgard" (Minnesota Mining and Manufacturing Company) and "Zepel" (E. I. du Pont de Nemours & Company) was applied to the top surface of the web, which was then again passed for about ½ minute through an oven at about 350° F.

EXAMPLE IV

The procedure of Example I was repeated using a circular knit plated fabric in which the thermoplastic component was continuous filament 210 denier polypropylene yarn and the non-thermoplastic component 40 count combed cotton yarn composed of 100% cotton, the plated fabric weighing 7 oz./sq. yd. and having approximately a 60% polypropylene content and a 40% cotton content. The laminate of this plated fabric and the 100% cotton circular jersey knit backing fabric, bonded by the same cement as was used in Example I, was then fed at a speed of 7 yds./min. through an embossing roll unit of the same basic construction but exerting a nip pressure of 500 pounds and having the metal embossing roll heated to a temperature of 300° F. The final product was also found to weigh approximately 12.5 oz./sq. yd., to be possessed of good "hand" or "feel" and of good cleaning characteristics and breathability, to be highly resistant to wear as well as to delamination upon washing in water, and to be suited for use in the same applications as the fabric of Example I.

EXAMPLE V

The procedure of Example V was repeated, using a plated fabric of the same basic construction and composition but weighing 6 oz./sq. yd., and a circular jersey knit backing fabric composed of a 50/50 blend of cotton and high wet strength rayon and weighing 3.2 oz./sq. yd. The final fabric, after the same lamination and embossing operations, weighed approximately 12 oz./sq. yd. and is found to be usable as an upholstery material for furniture and commercial seating structures, clothing, draperies, footwear, etc.

EXAMPLE VI

The procedure of Example V was repeated, using a circular jersey knit backing fabric composed of a blend of 35% cotton and 65% rayon and weighing 3.0 oz./sq. yd. The end product, weighing approximately 12 oz./sq. yd., was found to have appreciably greater strength, making it especially useful in commercial seating applications where the fabric generally is subjected to substantial stresses and strains.

EXAMPLE VII

The procedure of Example V was repeated, except that a woven backing fabric composed of a 50/50 cotton-rayon blend and weighing about 6 oz./sq. yd. was used. The operating conditions were the same except that the feed rate of the laminate through the embossing roll unit was reduced to 6 yd./min. The end product weighed approximately 10 oz./sq. yd. and was found to have a relatively high resistance to stretching, making it particularly useful in a variety of applications in which excessive stretching would result in loss or distortion of the embossed pattern and three-dimensional character of the fabric surface.

It should be noted that within reason all of the herein disclosed laminate constructions are basically interchangeable in any given application. The choice of any particular thermoplastic fiber for the plated fabric ply may, however, be dictated by some special considerations. Merely by way of example, a nylon-containing plated fabric is better suited to outdoor or sunlight exposure, by virtue of its better color fastness and resistance to ultraviolet degradation, than a polypropylene-containing plated fabric and would thus be preferred for uses where sunlight and outdoor exposures are normally encountered for substantial periods.

Having thus described my invention, what I claim and desire to secure by Letters Patent is:

1. A laminar fabric having a three-dimensional charactered surface, comprising a top ply composed of a knit plated fabric of thermoplastic and non-thermoplastic strand materials with substantially only the former exposed at one surface and only the latter at the other surface of the plated fabric, a bottom ply composed of a fabric of non-thermoplastic strand material, and a thin pliable film of an adhesive cement intermediate said bottom ply and said other surface of said top ply and adhesively bonding said plies to one another, said top ply being provided with a pattern of impressions dividing said one surface of said top ply into a corresponding pattern of raised surface portions imparting the desired three-dimensional character to said one surface.

2. A laminar fabric according to claim 1, wherein said bottom ply is a knit fabric.

3. A laminar fabric according to claim 1, wherein said bottom ply is a woven fabric.

4. A laminar fabric according to claim 1, said impressions extending only partly into said bottom ply, whereby the free surface of the latter is substantially plane.

5. A laminar fabric according to claim 1, said impressions extending entirely through said bottom ply to impart to the free surface of the latter a three-dimensional character which is a negative of said one surface of said top ply.

6. A laminar fabric having a three-dimensional charactered surface, comprising a top ply composed of a knit plated fabric of thermoplastic and non-thermoplastic yarns with substantially only said thermoplastic yarn exposed at one surface of the plated fabric and with substantially only said non-thermoplastic yarn exposed at the other surface of the plated fabric, the thermoplastic yarn content of the plated fabric being between about 20 and 70% of the weight of the plated fabric, a bottom ply composed of a fabric of non-thermoplastic yarn, and a thin pliable discontinuous film of an adhesive cement intermediate said bottom ply and said other surface of said top ply and adhesively bonding said plies to one another, said top ply being provided with a pattern of impressions dividing said one surface of said top ply into a corresponding pattern of raised surface portions imparting the desired three-dimensional character to said one surface.

7. A laminar fabric according to claim 6, wherein the thermoplastic yarn content of the plated fabric is between about 40 and 60% of the weight of the plated fabric.

8. A laminar fabric according to claim 6, said non-thermoplastic yarns of said top and bottom plies each being composed of fibers selected from the group consisting of cotton and rayon, with the cotton constituting from 25 to 100% of the yarn, and said bottom ply constituting between about 16 and 25% of the total weight of the laminate.

9. A laminar fabric according to claim 6, wherein said thermoplastic yarn is selected from the group of fibers consisting of nylon, polypropylene, polyethylene, polyester, vinyl polymers and copolymers, and acrylonitrile polymers and copolymers.

10. A laminar fabric according to claim 6, said cement comprising a material selected from the group consisting of plastisols and acrylic latexes.

11. A laminar fabric according to claim 6, wherein said thermoplastic yarn is a 200 denier multifilament yarn and constitutes 60% by weight of the plated fabric, said non-thermoplastic yarns of said plated and backing fabrics are 40 count 100% cotton yarns, said top ply constitutes about 60% by weight of the entire laminate, said bottom ply constitutes about 20% by weight of the entire laminate, and said cement is an acrylic latex and when dry constitutes about 15 to 20% by weight of the entire laminate.

12. A laminar fabric according to claim 6, wherein said one surface of said top ply is further provided with a printed design.

13. A laminar fabric according to claim 6, further comprising a layer of a foam selected from the group consisting of rubbery and resinous foams adhered to the free surface of said bottom ply.

14. A laminar fabric according to claim 6, wherein said bottom ply is a knit fabric.

15. A laminar fabric according to claim 6, wherein said bottom ply is a woven fabric.

16. The method of producing a laminar fabric having a three-dimensional charactered surface, comprising the steps of preparing a knit plated fabric of thermoplastic and non-thermoplastic yarns in which plated fabric substantially only said thermoplastic yarn is exposed at one surface of the plated fabric while substantially only said non-thermoplastic yarn is exposed at the other surface of the plated fabric, preparing a backing fabric of non-thermoplastic yarn, plying said plated and backing fabrics, with one face of said backing fabric juxtaposed to said other surface of said plated fabric and having a layer of an adhesive cement interposed therebetween, under heat and pressure so as to bond said one face of said backing fabric adhesively to said other surface of said plated fabric, and subjecting the entire laminate to a thermal embossing operation at said one surface of said plated fabric to provide thereon a predetermined pattern of shape-retaining raised and depressed surface portions defining the desired three-dimensional character of said one surface.

17. The method of claim 16, wherein said backing fabric is a knit fabric.

18. The method of claim 16, wherein said backing fabric is a woven fabric.

19. The method of producing a laminar fabric having a three-dimensional charactered surface, comprising the steps of preparing a knit plated fabric of thermoplastic and non-thermoplastic yarns, in which plated fabric the thermoplastic yarn content is between about 20 and 70% by weight of the plated fabric and substantially only said thermoplastic yarn is exposed at one surface of the plated fabric while substantailly only said non-thermoplastic yarn is exposed at the other surface of the plated fabric, preparing a backing fabric of non-thermoplastic yarn, applying to one face of said backing fabric a layer of an adhesive cement having a weight of about 3 to 5 oz./sq. yd. of said backing fabric and selected from the group consisting of acrylic latexes and vinyl plastisols, laminating said plated and backing fabrics to each other under heat and pressure so as to adhesively bond said one face of said backing fabric to said other surface of said plated fabric while substantially only said non-thermothermal embossing operation at said one surface of said plated fabric to provide thereon a predetermined pattern of shape-retaining raised and depressed surface portions defining the desired three-dimensional character of said one surface.

20. The method of claim 19, wherein the thermoplastic yarn content of the plated fabric is between about 40 and 60% by weight of the plated fabric.

21. The method of producing a laminar fabric having a three-dimensional charactered surface, comprising the steps of preparing a knit plated fabric of thermoplastic and non-thermoplastic yarns and of a weight sufficient to constitute about 50 to 60% of the total weight of the final laminate, in which plated fabric the thermoplastic yarn content is between about 40 and 60% by weight of the plated fabric and substantially only said thermoplastic yarn is exposed at one surface of the plated fabric while substantially only said non-thermoplastic yarn is exposed at the other surface of the plated fabric, preparing a backing fabric of non-thermoplastic yarn, applying to one face of said backing fabric a layer of an adhesive cement having a weight of about 3 to 5 oz./sq. yd. of said backing fabric and selected from the group consisting of acrylic latexes and vinyl plastisols, laminating said plated and backing fabrics to each other at an elevated temperature between about 200° and 300° F. so as to adhesively bond said one face of said backing fabric to said other surface of said plated fabric, and subjecting the entire laminate to a thermal embossing operation at least at said one surface of said plated fabric at a temperature between about 300° and 500° F. to provide on at least said one surface a predetermined pattern of shape-retaining raised and depressed surface portions defining the desired three-dimensional surface character of the laminar fabric.

22. The method of claim 21, further comprising the step of subjecting said one surface of said plated fabric to a printing operation prior to the embossing operation.

23. The method of claim 21, wherein said non-thermoplastic yarns are composed of fibers selected from the group consisting of cotton and rayon, with the cotton constituting from about 25 to 100% of the yarns.

24. The method of claim 21, wherein said backing fabric is a knit fabric.

25. The method of claim 21, wherein said backing fabric is a woven fabric.

26. The method of claim 21, wherein said thermoplastic yarn is selected from the group of fibers consisting of nylon, polypropylene, polyethylene, polyester, vinyl polymers and copolymers, and acrylonitrile polymers and copolymers.

References Cited

UNITED STATES PATENTS

| | | | |
|---|---|---|---|
| 3,257,262 | 6/1966 | Epskin | 161—98 X |
| 3,179,551 | 4/1965 | Dudas | 161—120 X |
| 3,044,914 | 7/1962 | Bell et al. | 161—120 |
| 2,973,293 | 2/1961 | Schofield | 161—98 |
| 2,771,661 | 11/1956 | Foster | 161—73 X |
| 2,184,772 | 12/1939 | Vamos | 161—77 |

FOREIGN PATENTS

| | | |
|---|---|---|
| 607,290 | 1/1933 | Germany. |
| 554,383 | 7/1943 | Great Britain. |

ROBERT F. BURNETT, *Primary Examiner.*

M. A. LITMAN, *Assistant Examiner.*

U.S. Cl. X.R.

156—176, 178, 219, 220; 161—89, 92, 97, 119, 156, 159

PO-1050
(5/69)

UNITED STATES PATENT OFFICE
CERTIFICATE OF CORRECTION

Patent No. 3,444,035              Dated   May 13, 1969

Inventor(s)  LESTER P. BUSHNELL

It is certified that error appears in the above-identified patent and that said Letters Patent are hereby corrected as shown below:

Column 2, line 28, "adhesive" should read --adhesion--. Column 6, line 16, "th" should read --the--; line 45, "V" should read --I--. Column 8, line 55, "substantailly" should read --substantially--; line 65, "while substantially only said non-thermo-" should read --, and subjecting the entire laminate to a--. Column 10, line 14, "Epskin" should read --Epstein--.

SIGNED AND
SEALED
OCT 13 1970

(SEAL)
Attest:

Edward M. Fletcher, Jr.
Attesting Officer

WILLIAM E. SCHUYLER, JR.
Commissioner of Patents